(12) United States Patent
McGuire, Jr.

(10) Patent No.: US 10,981,371 B2
(45) Date of Patent: Apr. 20, 2021

(54) PROTECTED GRAPHICS AND RELATED METHODS

(75) Inventor: James E. McGuire, Jr., Palm Beach, FL (US)

(73) Assignee: entrotech, inc., Columbus, OH (US)

(*) Notice: Subject to any disclaimer, the term of this patent is extended or adjusted under 35 U.S.C. 154(b) by 1072 days.

(21) Appl. No.: 12/017,031

(22) Filed: Jan. 19, 2008

(65) Prior Publication Data

US 2009/0186198 A1    Jul. 23, 2009

(51) Int. Cl.
*B32B 37/18* (2006.01)
*B44C 1/10* (2006.01)
(Continued)

(52) U.S. Cl.
CPC ............ *B32B 37/182* (2013.01); *B32B 27/08* (2013.01); *B32B 27/18* (2013.01); *B32B 27/22* (2013.01); *B32B 27/40* (2013.01); *B32B 37/12* (2013.01); *B44C 1/105* (2013.01); *B32B 2250/24* (2013.01); *B32B 2307/306* (2013.01); *B32B 2307/406* (2013.01); *B32B 2307/4026* (2013.01); *B32B 2307/546* (2013.01); *B32B 2307/554* (2013.01); *B32B 2307/71* (2013.01); *B32B 2307/714* (2013.01); *B32B 2307/718* (2013.01); *B32B 2451/00* (2013.01); *B32B 2605/00* (2013.01); *B32B 2605/08* (2013.01);
(Continued)

(58) Field of Classification Search
USPC .................. 428/41.6, 43, 44, 212, 195.1
See application file for complete search history.

(56) References Cited

U.S. PATENT DOCUMENTS 2,914,556 A    11/1958    Hostettler et al.
2,871,218 A    1/1959    Schollenberger
(Continued)

FOREIGN PATENT DOCUMENTS

AU    572168    5/1988
DE    2600241    7/1977
(Continued)

OTHER PUBLICATIONS

"EPON Resin 862 Product Bulletin," Resolution Performance Products (Houston, TX) RP:4048 (Mar. 2005).
(Continued)

*Primary Examiner* — Amber R Orlando
(74) *Attorney, Agent, or Firm* — The Griffith Law Firm, A P.C.; Lisa M. Griffith

(57) ABSTRACT

An improved protected graphics assembly according to the invention comprises the following sequential layers: optionally, at least one adhesive layer; at least one graphics layer; and at least one outwardly exposed polymer layer that is essentially free of low surface energy materials and has a gloss value of greater than 90 when tested according to ASTM D2457-03 at a 60-degree angle. The assembly is beneficially applied to a variety of articles and used in a variety of related methods. In an exemplary embodiment, a race car comprises a protected graphics assembly that comprises: optionally, at least one adhesive layer; at least one outwardly exposed polymer layer that is essentially free of low surface energy materials; and at least one graphics layer substantially protected from exterior exposure by the polymer layer.

27 Claims, 1 Drawing Sheet

(51) Int. Cl.
| | |
|---|---|
| *B32B 27/08* | (2006.01) |
| *B32B 27/22* | (2006.01) |
| *B32B 27/40* | (2006.01) |
| *B32B 27/12* | (2006.01) |
| *B44C 1/17* | (2006.01) |
| *B44C 1/165* | (2006.01) |
| *G09F 21/04* | (2006.01) |
| *G09F 21/06* | (2006.01) |
| *G09F 21/08* | (2006.01) |
| *B32B 27/18* | (2006.01) |
| *B32B 37/12* | (2006.01) |

(52) U.S. Cl.
CPC ............ *B44C 1/165* (2013.01); *B44C 1/1733* (2013.01); *G09F 21/04* (2013.01); *G09F 21/06* (2013.01); *G09F 21/08* (2013.01); *Y10T 156/10* (2015.01); *Y10T 428/2495* (2015.01); *Y10T 428/24802* (2015.01); *Y10T 428/26* (2015.01); *Y10T 428/31504* (2015.04); *Y10T 428/31551* (2015.04)

(56) References Cited

U.S. PATENT DOCUMENTS

| | | | | |
|---|---|---|---|---|
| 3,296,196 | A | | 1/1967 | Lamoreaux |
| 3,463,662 | A | | 8/1969 | Hodes et al. |
| 3,509,015 | A | | 4/1970 | Wismer et al. |
| 3,523,100 | A | | 8/1970 | Stein et al. |
| 3,523,101 | A | | 8/1970 | Reuter |
| 3,549,583 | A | * | 12/1970 | Ryuzo et al. .................. 524/871 |
| 3,554,951 | A | | 1/1971 | Blomeyer et al. |
| 3,616,198 | A | * | 10/1971 | Saito .............................. 428/461 |
| 3,661,672 | A | * | 5/1972 | McQuade, Jr. ................ 156/220 |
| 3,867,350 | A | | 2/1975 | Pedain et al. |
| 3,899,467 | A | | 8/1975 | Bonk et al. |
| 3,899,621 | A | | 8/1975 | Willdorf |
| 4,007,151 | A | | 2/1977 | Ogawa et al. |
| 4,081,578 | A | | 3/1978 | Van Essen et al. |
| 4,092,198 | A | * | 5/1978 | Scher et al. ................... 156/222 |
| 4,092,199 | A | * | 5/1978 | Ungar et al. ................... 156/222 |
| 4,093,766 | A | * | 6/1978 | Scher et al. ................... 428/165 |
| 4,101,698 | A | | 7/1978 | Dunning et al. |
| 4,154,882 | A | * | 5/1979 | Ungar et al. ................... 428/165 |
| 4,201,799 | A | | 5/1980 | Stephens |
| 4,207,356 | A | | 6/1980 | Waugh |
| 4,241,140 | A | | 12/1980 | Ammons |
| 4,269,945 | A | | 5/1981 | Vanderhider |
| 4,296,156 | A | | 10/1981 | Lustig et al. |
| 4,371,686 | A | | 1/1983 | Yamamoto et al. |
| 4,387,129 | A | | 6/1983 | Vincent |
| 4,420,525 | A | * | 12/1983 | Parks ............................. 428/156 |
| 4,476,293 | A | | 10/1984 | Robinson |
| 4,496,628 | A | | 1/1985 | Deatcher et al. |
| 4,501,852 | A | | 2/1985 | Markusch et al. |
| 4,530,976 | A | | 7/1985 | Kordomenos et al. |
| 4,550,052 | A | | 10/1985 | Malek |
| 4,578,426 | A | | 3/1986 | Lenz et al. |
| 4,611,043 | A | | 9/1986 | Burson et al. |
| 4,657,795 | A | | 4/1987 | Foret |
| 4,705,721 | A | | 11/1987 | Frisch et al. |
| 4,741,961 | A | | 5/1988 | Frisch et al. |
| 4,745,152 | A | | 5/1988 | Fock et al. |
| 4,748,192 | A | | 5/1988 | Smith |
| 4,751,121 | A | | 6/1988 | Kuhnel et al. |
| 4,766,038 | A | | 8/1988 | de Vroom et al. |
| 4,774,043 | A | | 9/1988 | Beckmann |
| 4,810,540 | A | | 3/1989 | Ellison et al. |
| 4,900,611 | A | | 2/1990 | Carroll |
| 4,913,760 | A | | 4/1990 | Benson et al. |
| 4,917,928 | A | | 4/1990 | Heinecke |
| 4,919,994 | A | * | 4/1990 | Incremona et al. ............ 428/141 |
| 4,921,776 | A | | 5/1990 | Taylor |
| 4,931,324 | A | | 6/1990 | Ellison et al. |
| 4,933,237 | A | | 6/1990 | Krenceski et al. |
| 4,948,654 | A | | 8/1990 | Brooks et al. |
| 4,966,527 | A | | 10/1990 | Merz |
| 5,000,903 | A | | 3/1991 | Matzinger et al. |
| 5,034,275 | A | | 7/1991 | Pearson et al. |
| 5,055,346 | A | * | 10/1991 | Rohrbacher ................... 428/216 |
| 5,070,172 | A | | 12/1991 | Hirai et al. |
| 5,077,373 | A | | 12/1991 | Tsuda et al. |
| 5,114,514 | A | * | 5/1992 | Landis .......................... 156/153 |
| 5,114,789 | A | | 5/1992 | Reafler |
| 5,123,814 | A | | 6/1992 | Burdick et al. |
| 5,141,783 | A | | 8/1992 | Corsi et al. |
| 5,203,189 | A | | 4/1993 | Lovejoy et al. |
| 5,215,811 | A | | 6/1993 | Reafler et al. |
| 5,219,643 | A | | 6/1993 | Schmidt et al. |
| 5,232,527 | A | | 8/1993 | Vernhet et al. |
| 5,242,744 | A | | 9/1993 | Schryer |
| 5,242,751 | A | | 9/1993 | Hartman |
| 5,268,215 | A | | 12/1993 | Krenceski et al. |
| 5,288,356 | A | | 2/1994 | Benefiel |
| 5,306,548 | A | | 4/1994 | Zabrocki et al. |
| 5,310,080 | A | | 5/1994 | Figge |
| 5,334,450 | A | | 8/1994 | Zabrocki et al. |
| 5,342,666 | A | | 8/1994 | Ellison et al. |
| 5,391,686 | A | | 2/1995 | Jadhav et al. |
| 5,403,880 | A | | 4/1995 | Hegedus et al. |
| 5,405,675 | A | | 4/1995 | Sawka et al. |
| 5,468,532 | A | | 11/1995 | Ho et al. |
| 5,478,596 | A | | 12/1995 | Gurney |
| 5,486,096 | A | | 1/1996 | Hertel et al. |
| 5,518,786 | A | | 5/1996 | Johnson et al. |
| 5,556,677 | A | | 9/1996 | Quigley et al. |
| 5,560,979 | A | * | 10/1996 | Bloom et al. ............... 428/195.1 |
| 5,562,979 | A | | 10/1996 | Easterlow et al. |
| 5,563,206 | A | | 10/1996 | Eicken et al. |
| 5,567,502 | A | | 10/1996 | Miyabara et al. |
| 5,582,887 | A | | 12/1996 | Etheredge |
| 5,587,230 | A | | 12/1996 | Lin et al. |
| 5,604,006 | A | | 2/1997 | Ponchaud et al. |
| 5,614,297 | A | | 3/1997 | Velazquez |
| 5,620,819 | A | * | 4/1997 | Conforti et al. ................. 430/14 |
| 5,641,374 | A | | 6/1997 | Peterson et al. |
| 5,688,571 | A | | 11/1997 | Quigley et al. |
| 5,707,941 | A | | 1/1998 | Haberle |
| 5,736,204 | A | | 4/1998 | Suskind |
| 5,768,285 | A | | 6/1998 | Griep et al. |
| 5,770,313 | A | | 6/1998 | Furumoto et al. |
| 5,786,285 | A | | 7/1998 | Walla et al. |
| 5,820,491 | A | | 10/1998 | Hatch et al. |
| 5,848,769 | A | | 12/1998 | Fronek et al. |
| 5,849,168 | A | | 12/1998 | Lutz |
| 5,858,495 | A | | 1/1999 | Eikmeier et al. |
| 5,866,257 | A | | 2/1999 | Schledjewski et al. |
| 5,877,254 | A | | 3/1999 | La Casse et al. |
| 5,882,775 | A | | 3/1999 | Matsui et al. |
| 5,912,081 | A | | 6/1999 | Negele et al. |
| 5,912,193 | A | | 6/1999 | Iwata et al. |
| 5,912,195 | A | | 6/1999 | Walla et al. |
| 5,928,778 | A | | 7/1999 | Takahashi et al. |
| 5,939,188 | A | | 8/1999 | Moncur et al. |
| 5,945,199 | A | | 8/1999 | Morin et al. |
| 5,955,204 | A | | 9/1999 | Yamamoto et al. |
| 5,965,256 | A | | 10/1999 | Barrera |
| 5,968,444 | A | | 10/1999 | Yamamoto |
| 5,985,079 | A | * | 11/1999 | Ellison ....................... 156/244.23 |
| 6,001,906 | A | | 12/1999 | Golumbic |
| 6,037,054 | A | | 3/2000 | Shirai et al. |
| 6,054,208 | A | | 4/2000 | Rega et al. |
| 6,071,583 | A | | 6/2000 | Pomerantz |
| 6,096,396 | A | | 8/2000 | Patton et al. |
| 6,132,864 | A | | 10/2000 | Kiriazis et al. |
| 6,153,718 | A | | 11/2000 | Imashiro et al. |
| 6,177,189 | B1 | | 1/2001 | Rawlings et al. |
| 6,210,295 | B1 | | 4/2001 | Yoneyama |
| 6,210,796 | B1 | | 4/2001 | Lobert et al. |
| 6,254,712 | B1 | | 7/2001 | Enlow et al. |
| 6,258,918 | B1 | | 7/2001 | Ho et al. |
| 6,319,353 | B1 | | 11/2001 | Mussig |
| 6,336,988 | B1 | | 1/2002 | Enlow et al. |

(56) References Cited

U.S. PATENT DOCUMENTS

| | | |
|---|---|---|
| 6,369,186 B1 | 4/2002 | Branlard et al. |
| 6,383,644 B2 | 5/2002 | Fuchs |
| 6,389,602 B1 | 5/2002 | Alsaffar |
| 6,399,193 B1 | 6/2002 | Ellison |
| 6,436,531 B1 | 8/2002 | Kollaja et al. |
| 6,458,875 B1 | 10/2002 | Sandlin et al. |
| 6,458,880 B1 | 10/2002 | Onder et al. |
| 6,475,559 B1 | 11/2002 | Bettinger |
| 6,475,616 B1 | 11/2002 | Dietz et al. |
| 6,479,142 B1 | 11/2002 | Condon et al. |
| 6,485,836 B2 | 11/2002 | Reihs et al. |
| 6,518,359 B1 | 2/2003 | Clemens et al. |
| 6,518,389 B1 | 2/2003 | Kaufhold et al. |
| 6,521,164 B1 | 2/2003 | Plummer et al. |
| 6,521,337 B2 | 2/2003 | Yanagiuchi |
| 6,579,601 B2 | 6/2003 | Kollaja et al. |
| 6,592,173 B2 | 7/2003 | Hardgrive et al. |
| 6,602,591 B1 | 8/2003 | Smith |
| 6,607,831 B2 | 8/2003 | Ho et al. |
| 6,612,944 B1 | 9/2003 | Bureau |
| 6,624,276 B2 | 9/2003 | Lamers et al. |
| 6,627,018 B1 | 9/2003 | O'Neill et al. |
| 6,638,467 B1 | 10/2003 | Yamamoto |
| 6,642,159 B1 | 11/2003 | Bhatnagar et al. |
| 6,649,003 B1 | 11/2003 | Spain et al. |
| 6,649,693 B2 | 11/2003 | Konishi et al. |
| 6,651,011 B1 | 11/2003 | Bache |
| 6,659,625 B2 | 12/2003 | Hanasaki |
| 6,673,428 B1 | 1/2004 | Reafler |
| 6,677,028 B1 | 1/2004 | Lasch et al. |
| 6,680,111 B1 | 1/2004 | Leibler et al. |
| 6,682,679 B1 | 1/2004 | Marentic et al. |
| 6,709,723 B2 | 3/2004 | Roys et al. |
| 6,709,748 B1 | 3/2004 | Ho et al. |
| 6,713,185 B2 | 3/2004 | Carlson et al. |
| 6,723,427 B1 | 4/2004 | Johnson et al. |
| 6,723,472 B2 | 4/2004 | Nakanishi et al. |
| 6,726,971 B1 | 4/2004 | Wong |
| 6,730,388 B2 | 5/2004 | MacQueen et al. |
| 6,733,870 B2 | 5/2004 | Enlow et al. |
| 6,734,273 B2 | 5/2004 | Onder |
| 6,753,056 B1 | 6/2004 | Mizumoto |
| 6,755,757 B2 | 6/2004 | Sutherland |
| 6,762,243 B2 | 7/2004 | Stender et al. |
| 6,770,360 B2 | 8/2004 | Mientus et al. |
| 6,790,525 B2 | 9/2004 | Takeuchi et al. |
| 6,790,526 B2 | 9/2004 | Vargo et al. |
| 6,797,098 B2 | 9/2004 | Watanabe et al. |
| 6,806,212 B2 | 10/2004 | Fyfe |
| 6,811,628 B1 | 11/2004 | Reid et al. |
| 6,824,818 B2 | 11/2004 | McCoy et al. |
| 6,824,834 B2 | 11/2004 | Schafheutle et al. |
| 6,827,895 B1 | 12/2004 | Yamamoto |
| 6,835,267 B1 | 12/2004 | Spain et al. |
| 6,838,130 B1 * | 1/2005 | Spain et al. |
| 6,852,268 B1 | 2/2005 | Valyi et al. |
| 6,852,377 B2 | 2/2005 | Bohm et al. |
| 6,852,418 B1 | 2/2005 | Zurbig et al. |
| 6,866,383 B2 * | 3/2005 | Naik et al. .................... 347/105 |
| 6,869,496 B1 | 3/2005 | Kollaja et al. |
| 6,881,856 B2 | 4/2005 | Tanaka et al. |
| 6,890,628 B2 * | 5/2005 | Kerr .......................... 428/195.1 |
| 6,893,596 B2 | 5/2005 | Haas et al. |
| 6,894,084 B2 | 5/2005 | Kovar et al. |
| 6,908,401 B2 | 6/2005 | Cheng |
| 6,966,962 B2 | 11/2005 | Spain et al. |
| 6,998,084 B2 | 2/2006 | Horansky |
| 7,005,103 B2 | 2/2006 | Smith et al. |
| 7,005,183 B2 | 2/2006 | Kondo |
| 7,005,794 B2 | 2/2006 | Watanabe et al. |
| 7,011,777 B2 | 3/2006 | Schmidt |
| 7,048,989 B2 | 5/2006 | Watkins et al. |
| 7,108,618 B2 | 9/2006 | Frischmon et al. |
| 7,128,669 B2 | 10/2006 | Blotteaux |
| 7,141,294 B2 | 11/2006 | Sakurai et al. |
| 7,141,303 B2 | 11/2006 | Clemens et al. |
| 7,160,973 B2 | 1/2007 | Ohrbom et al. |
| 7,166,249 B2 | 1/2007 | Abrams et al. |
| 7,279,057 B2 | 10/2007 | Reid et al. |
| 7,282,533 B2 | 10/2007 | Kreitschmann et al. |
| 7,316,832 B2 * | 1/2008 | Steinhardt et al. ............ 428/33 |
| RE40,723 E | 6/2009 | Matsui et al. |
| 7,854,985 B2 | 12/2010 | Song et al. |
| 7,931,954 B2 | 4/2011 | Kobayashi et al. |
| 8,062,451 B2 | 11/2011 | Mozer et al. |
| 8,071,000 B2 | 12/2011 | Neitzke et al. |
| 8,105,686 B2 | 1/2012 | Blackwell et al. |
| 8,117,679 B2 | 2/2012 | Pierce |
| 8,501,315 B2 | 8/2013 | Tanaka et al. |
| 8,551,279 B2 | 10/2013 | Johnson et al. |
| 8,568,849 B2 | 10/2013 | Shi et al. |
| 8,765,263 B2 | 7/2014 | Ho et al. |
| 8,828,303 B2 | 9/2014 | McGuire, Jr. et al. |
| 8,927,106 B2 | 1/2015 | Ho et al. |
| 2002/0006516 A1 | 1/2002 | Ito et al. |
| 2002/0015772 A1 | 2/2002 | Munch et al. |
| 2002/0018889 A1 | 2/2002 | Franck et al. |
| 2002/0061374 A1 | 5/2002 | O'Brien et al. |
| 2002/0193460 A1 | 12/2002 | Kovar et al. |
| 2002/0195910 A1 | 12/2002 | Hus et al. |
| 2003/0003282 A1 | 1/2003 | Roys et al. |
| 2003/0026932 A1 | 2/2003 | Johnson et al. |
| 2003/0060574 A1 | 3/2003 | Muller et al. |
| 2003/0203190 A1 | 10/2003 | Schmidt et al. |
| 2003/0211334 A1 | 11/2003 | Jones |
| 2004/0048073 A1 | 3/2004 | Bacon |
| 2004/0071980 A1 | 4/2004 | McBain et al. |
| 2004/0096630 A1 | 5/2004 | Sakurai et al. |
| 2004/0145092 A1 | 7/2004 | McCollum et al. |
| 2004/0159969 A1 | 8/2004 | Truog et al. |
| 2004/0161567 A1 | 8/2004 | Truog et al. |
| 2004/0170793 A1 | 9/2004 | Linden et al. |
| 2004/0197572 A1 | 10/2004 | Bell |
| 2004/0200564 A1 | 10/2004 | Kinsey et al. |
| 2004/0208998 A1 | 10/2004 | Steininger et al. |
| 2004/0209057 A1 | 10/2004 | Enlow et al. |
| 2004/0214007 A1 | 10/2004 | Brown et al. |
| 2005/0042431 A1 | 2/2005 | Wagenblast |
| 2005/0059309 A1 | 3/2005 | Tsotsis |
| 2005/0069686 A1 | 3/2005 | Hoops |
| 2005/0069698 A1 | 3/2005 | Eubanks et al. |
| 2005/0084696 A1 | 4/2005 | Gaggar et al. |
| 2005/0113194 A1 | 5/2005 | Pearson |
| 2005/0136205 A1 | 6/2005 | Stoppelmann et al. |
| 2005/0148404 A1 | 7/2005 | Ignatius |
| 2005/0156358 A1 | 7/2005 | Bellefleur et al. |
| 2005/0159060 A1 | 7/2005 | Shao |
| 2005/0164008 A1 | 7/2005 | Rukavina |
| 2005/0175794 A1 * | 8/2005 | Dathe .................... B29C 43/18 428/31 |
| 2005/0181203 A1 * | 8/2005 | Rawlings et al. ............ 428/337 |
| 2005/0186415 A1 | 8/2005 | McCormick et al. |
| 2005/0191490 A1 | 9/2005 | Ton-That et al. |
| 2005/0214559 A1 | 9/2005 | Minoda et al. |
| 2006/0046028 A1 | 3/2006 | Kaminski et al. |
| 2006/0127666 A1 | 6/2006 | Fuchs |
| 2007/0036929 A1 | 2/2007 | Baird et al. |
| 2007/0047099 A1 | 3/2007 | Clemens et al. |
| 2007/0116933 A1 | 3/2007 | Kobayashi et al. |
| 2007/0178239 A1 * | 8/2007 | Kestell et al. ............. 427/393.4 |
| 2008/0003406 A1 | 1/2008 | Steelman |
| 2008/0199704 A1 | 8/2008 | Ho et al. |
| 2008/0261014 A1 | 10/2008 | McGuire et al. |
| 2008/0286576 A1 | 11/2008 | McGuire |
| 2009/0292057 A1 | 11/2009 | Handa et al. |
| 2010/0059167 A1 | 3/2010 | McGuire, Jr. |
| 2010/0068446 A1 | 3/2010 | McGuire, Jr. et al. |
| 2010/0089434 A1 | 4/2010 | Fishman |
| 2011/0045306 A1 | 2/2011 | Johnson et al. |
| 2011/0137006 A1 | 6/2011 | McGuire, Jr. et al. |
| 2012/0255562 A1 | 10/2012 | McGuire, Jr. |
| 2014/0212674 A1 | 7/2014 | Ho et al. |

(56) References Cited

U.S. PATENT DOCUMENTS

| | | |
|---|---|---|
| 2015/0099113 A1 | 4/2015 | Ho et al. |
| 2015/0361306 A1 | 12/2015 | McGuire, Jr. |
| 2018/0291236 A1 | 10/2018 | McGuire, Jr. |

FOREIGN PATENT DOCUMENTS

| | | |
|---|---|---|
| DE | 197 15 871 | 6/1998 |
| DE | 10214827 | 10/2003 |
| EP | 0 251 546 | 3/1992 |
| EP | 0 978 374 A2 | 2/2000 |
| EP | 1 144 125 | 7/2003 |
| EP | 1 386 950 | 2/2004 |
| EP | 0 808 885 | 4/2004 |
| EP | 1004608 B2 | 10/2004 |
| EP | 1 481 031 | 7/2007 |
| EP | 1 874 541 | 11/2011 |
| EP | 2 404 729 | 1/2012 |
| EP | 2463093 | 6/2012 |
| EP | 2463094 | 6/2012 |
| EP | 1 937 475 | 9/2017 |
| JP | 2169228 | 6/1990 |
| JP | 6-143506 | 5/1994 |
| JP | 07-052176 | 2/1995 |
| JP | 07-074322 | 8/1995 |
| JP | 2000-260252 | 9/2000 |
| JP | 2001-253033 | 9/2001 |
| JP | 2003-527258 | 9/2003 |
| JP | 2004-307532 | 11/2004 |
| JP | 2005-125506 | 5/2005 |
| JP | 2005335120 | 12/2005 |
| WO | WO-90/11878 | 10/1990 |
| WO | WO-92/02731 | 2/1992 |
| WO | WO-92/16367 | 10/1992 |
| WO | WO-92/22619 | 12/1992 |
| WO | WO-93/24551 | 12/1993 |
| WO | 94/13465 A1 | 6/1994 |
| WO | WO-96/10595 | 4/1996 |
| WO | WO-97/28472 | 8/1997 |
| WO | WO-98/37115 | 8/1998 |
| WO | WO-01/29144 | 4/2001 |
| WO | WO-02/31074 | 4/2002 |
| WO | WO-2002/028636 | 4/2002 |
| WO | WO-2003/002680 | 1/2003 |
| WO | WO-2003/049942 | 6/2003 |
| WO | WO-03/076542 | 9/2003 |
| WO | WO-2004/067246 | 8/2004 |
| WO | WO-2005/032812 | 4/2005 |
| WO | WO-2006/118883 | 11/2006 |
| WO | 07/048141 A3 | 4/2007 |
| WO | 07/048145 A3 | 4/2007 |
| WO | WO-2007/048141 | 4/2007 |
| WO | WO-2007/120188 | 10/2007 |
| WO | WO-08/051629 | 5/2008 |
| WO | WO-2008/0109733 | 9/2008 |
| WO | WO-2009/041964 | 4/2009 |
| WO | WO-2015/195494 | 12/2015 |
| WO | WO-2017/156507 | 9/2017 |

OTHER PUBLICATIONS

"Epoxy Curing Agents and Modifiers: Ancamine 2441 Curing Agent," Air Products and Chemicals (Allentown, PA) Publication No. 125-04-017-GLB (2004).

"Epoxy Curing Agents and Modifiers: Amicure CG-1200 Curing Agent," Air Products and Chemicals (Allentown, PA) Publication No. 125-9416.7.

"Epoxy Curing Agents and Modifiers: Amicure UR Curing Agent," Air Products and Chemicals (Allentown, PA) Publication No. 125-9416.11.

"EPON Resin 828 Product Bulletin", Resolution Performance Products (Houston, TX) RP:3075-01 (Apr. 2002).

"Blade Protection Kits Keep Helicopters in the Air," *EngineeringTalk* (www.engineeringtalk.com/news/mmr/mmr102.html) (Sep. 16, 2005).

"EPON Resin Structural Reference Manual—EPON Resins—EPICURE Curing Agents—Heloxy Modifiers," Resolution Performance Products (Houston, TX), pp. 3i to 3-6 (2001).

"3M Aircraft Belly Protective Tape 8641 Technical Data Sheet," Minnesota Mining & Manufacturing Co. (St. Paul, MN) Publication No. 70-0703-7681-2 (Mar. 2007).

"3M Polyurethane Protective Tape 8674/8674DL Technical Data Sheet," Minnesota Mining & Manufacturing Co. (St. Paul, MN) Publication No. 60-9700-0074-5 (Nov. 2005).

"3M Polyurethane Protective Tape 8672/8672 GB Technical Data Sheet," Minnesota Mining & Manufacturing Co. (St. Paul, MN) Publication No. 78-9236-7045-5 (Nov. 2004).

"Improved Scotchgard Paint Protection Film Uses Latest 3M Technology," *3M News: SEMA Show 2005*, (Nov. 1, 2005).

"An Amazing New Automotive Finish Protection Film to Keep Your Vehicle in Showroom Condition . . . VentureShield," (http://www.venturetape.com/final/new_products.htm) VentureTape (Rockland, MA).

"Ford Pressure Sensitive Performance Testing (Venture Tape) for Test Materials: 7510 and 7514," ACT Laboratories, Inc. (Hillsdale, MI), published at: http://www.invisiblepatterns.com/pdf/AIN154314C.pdf, (Dec. 30, 2005).

"Paint Protection Film FAQ's," previously published at: http://enprodistributing.com/products/protection/faq.htm, (Jul. 12, 2005).

"Polyurethane Coatings for Automotive Exteriors," published at: http://www.bayermaterialscienceafta.com/industries/automotive/coatings.html#3.

"Scotchgard Paint Protection Film SGPF6 for Professional Applicators," 3M Technical Data Sheet 75-3469-1065-8, Minnesota Mining & Manufacturing Co. (St. Paul, MN) (Apr. 2004).

"Scotchgard Paint Protection Film: Application Guide for Professional Applicators," 3M Technical Update 75-3469-1102-9, Minnesota Mining & Manufacturing Co. (St. Paul, MN) (Apr. 2004).

"3M Paint Protection Film: A Clear Alternative to Vehicle Bras or Guards," 3M Automotive Aftermarket Division 75-3467-9992-9, Minnesota Mining & Manufacturing Co. (St. Paul, MN) (2003).

"3M Paint Protection Film Builds Business through the SEMA Show," *3M Holding Fast*, 3M Automotive Division (St. Paul, MN), 1(25) (2002).

"Venture Shield Paint Protection 7510," VentureTape (Rockland, MA), published at: http://www.venturetape.com/final/automotive_products.asp?id=609 (Jul. 12, 2005).

"Venture Shield—Paint Protection 7512", VentureTape (Rockland, MA), published at: http://www.venturetape.com/final/automotive_products.asp?id=610 (Jul. 12, 2005).

"Test Report—Venture Shield 7510," Bodycote Materials Testing Met-Chem Laboratory, published at: http://www.invisiblepatterns.com/pdf/067682.pdf, Letter Dated Jan. 14, 2003—Report No. 067682 (Jan. 14, 2003).

"Avery Dennison StoneShield Technical Data Sheet".

"EPON Resins and Modifiers," Resolution Performance Products SC:3059-01 (2002).

*AircraftLog: Where Smart Solutions Take Flight*, PPG Industries, Inc. (Huntsville, AL). (May 2005), pp. 10-11 and 16.

"CAB-O-SIL TS-720," Cabot Corporation (Billerica, MA) PDS-141 (Jan. 2006).

"Argotec Fills Industry Need with Thin, Aliphatic-Grade Polyurethane Films," *Argotec Press Release*, www.argotecinc.com (2006).

"Aircraft Painting," *KLM Engineering & Maintenance*, www.klm-em.com (Jun. 27, 2007).

*engineering Edge*, Air France KLM (Jan. 2006).

"ECLIPSE High Performance Exterior Topcoat," *Akzo Nobel Aerospace Coatings*, www.akzonobelaerospace.com.

Umamaheswaran, Venkatakrishnan et al., "New Weatherable Film Technology to Eliminate Painting of Automotive Exteriors," *Society of Automotive Engineers: 2001-01-0443*, (2001).

"Argotec 49510 Technical Data Sheet," Argotech, Inc. (Greenfield, MA) (Oct. 2003).

"EPON Resin 863 Technical Data Sheet," Hexion Specialty Chemicals (Houston, TX) RP:4041 (Jun. 2004).

"3M FTA 9055 J—3M™ Premium Plus Blackout Film with Comply™ Feature," Technical Data Sheet FTA 9055 J E_01/MW, Rev.

(56) References Cited

OTHER PUBLICATIONS

1, Ref. TL-10177, retrieved on Sep. 12, 2017 from http://multimedia.3m.com/mws/media/880023O/3m-premium-plus-blackout-film-with-comply-feature.pdf (Jun. 2008).
"3M Paint Replacement Film F577," Technical Data Sheet, retrieved on Sep. 12, 2017 from https://multimedia.3m.com/mws/media/514553O/3mtm-paint-replacement-film 4577.pdf (Mar. 2017).
"3M™ Paint Replacement Films with Comply™ Adhesive Performance," Technical Bulletin, retrieved on Sep. 12, 2017 at http://multimedia.3m.com/mws/media/557534O/3m-paint-replacement-film-with-comply-adh-perf-tech-bulletin.pdf (Nov. 2008).
"Laminating Problems and Solutions," Mactac Technical Bulletin 7.8, vol. 2, retrieved on Sep. 13, 2017 from http://www.mactac.eu/datas/files/Technical%20Bulletin%207%208%20Laminating%20problems%20%20solutions.pdf (Sep. 2012).
"SABIC Innovative Plastics™ Lexan SLX Resin," SABIC-PLA-829, retrieved on Sep. 12, 2017 from http://www.pod-sabic-ip.com/KBAM/Reflection/Assets/Thumbnail/8457_15.pdf (Dec. 2008).

\* cited by examiner

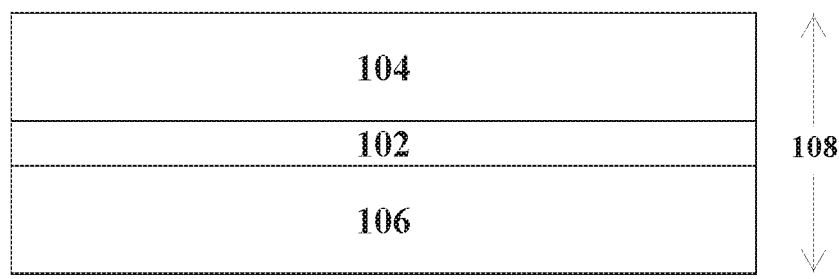

PROTECTED GRAPHICS AND RELATED METHODS

BACKGROUND OF THE INVENTION

The present invention relates generally to improved protected graphics and methods related to the same, which graphics and related methods are particularly useful for application to vehicles according to an exemplary aspect of the invention.

Graphical images (also referred to simply as "graphics") take many forms and are used to provide desired textual or pictorial representations on a surface. A wide variety of materials are used to create graphical images on a surface, and graphics can generally be applied to a wide variety of surfaces. With that in mind, graphic designers face many challenges. A primary challenge is associated with successful application of a graphical image having a desired quality on a surface. Another challenge is associated with maintaining those applied graphics over time. As an example, materials used to create graphical images on a surface are prone to fading when exposed to radiation such as that in ultraviolet (UV) light. Mechanical (e.g., abrasive) or chemical contact with graphical images also tends to degrade such graphics over time. Quality of a graphical image is often balanced against a competing interest in permanence of that image.

In order to increase permanency of graphical images, ink used to create such images is often formulated with additives that improve mar resistance or other performance properties of the ink. Such additives include, for example, silicones and other low surface energy materials. A problem arising from the use of such relatively low surface energy additives, however, is the tendency of low surface energy additives to decrease the adherence of the inks to many substrates. Thus, while the ink itself may be improved with respect to its ability to resist degradation, the ink may not adequately adhere to the surface on which it is printed to form a graphical image, which can affect both the quality and the permanence of the image.

Another attempt to increase permanency of graphical images is application of the graphics under a film such that the graphics are outwardly visible, but yet protected, on a surface. Using this approach, graphics can be printed on a polymer film and adhered to a surface such that the graphical image lies between the polymer film and an underlying surface. The types of polymer films conventionally used in this approach are generally polyesters or fluoropolymers. Quality of the graphical image is often compromised, however, as the visual quality of the polymer film is generally not sufficient to allow undistorted viewing of the underlying graphics.

Further, conventional inks used to form such graphical images, which often have low surface energy additives as discussed above, often do not adequately adhere to adjacent polymer films or the low surface energy of an adjacent polymer film, such as a fluoropolymer film, can impair such adherence. Adherence is not only a factor as far as maintenance of graphics on a surface is concerned, but it is also a factor associated with ease of removability of such graphics when desired. For example, as team sponsorship or other insignia placed on a race car or other transportation vehicle changes, it is often desirable to easily remove outdated graphics from a vehicle's surface so that updated graphics can be applied in their place. When the graphics are part of an assembly containing multiple layers, interlayer delamination associated with inadequate adherence between layers can complicate the removal process.

A further consideration associated with protecting graphics with a polymer film overlay is weight associated with the polymer film. Particularly in the transportation industry, additional weight may lead to consumption of excess fuel and restrictions on the number of passengers or amount of cargo that an associated vehicle can safely and efficiently transport. Additional weight can also compromise operation of high performance vehicles, such as race cars. For example, as weight restrictions are often imposed on race cars, additional weight associated with surface paint or film decreases the amount of weight that can be strategically positioned elsewhere on the vehicle—such as in areas designed to increase the downforce (i.e., the downward pressure created by the aerodynamic characteristics of a car that allows it to travel faster through a corner by holding the car to the track or road surface) and, hence, performance of a race car. In particular, NASCAR's "Car of Tomorrow" is highly standardized, with more than two-hundred defined points that must be adhered to when designing a race car. Impacted by these new standards is aerodynamics of the race car. Making race cars wider and taller according to the new standards typically results in a corresponding sacrifice in aerodynamics, resulting in a slower average speed for the race car on a track. Thus, optimizing aerodynamic performance of a race car, which is impacted by the geometry and materials associated with a vehicle's surface, is highly desirable and of increasing concern.

Specific examples of some of the foregoing approaches to protecting graphics are now described. In setting forth the background of their teachings, U.S. Patent Publication No. 20070036929 (Boeing) describes how a conventional decal system (typically having a thickness of around 5 mils (125 microns)) consists of a clear polymer film provided to a printer, who prints graphics on the bottom side of the film, then applies pressure-sensitive adhesive.

According to the disclosure of this Boeing patent publication, thin film appliques are prepared for application to aircraft and, after their application, include a polymer film, a pattern layer, a pressure-sensitive adhesive, and an overlying clearcoat. Polymer films described therein are urethane, acrylic, epoxy, vinyl, or polyester and have a thickness of between 0.5 mil (13 microns) and 1.0 mil (25 microns). Pattern layers, which may embody graphics, are said to be formed from acceptable commercial-off-the-shelf inks, including pigmented acrylic ink, pigmented fast-dry acrylic ink, urethane ink with pigment, epoxy ink, and urethane enamel coating such as DESOTHANE brand coatings (available from PRC Desoto International, Inc. of Glendale, Calif.). The systems therein are described as being applicable to an aircraft skin, after which time edge sealer (e.g., a clearcoat) is applied around its borders. The clearcoat is substantial, having a thickness equalized toward a combined thickness of the remaining layers—i.e., the polymer film, the pattern layer, and the pressure-sensitive adhesive. The clearcoat is said to provide a smooth finish, a high gloss on the order of around 80-90 gloss units, and resistance to impacts and degrading fluids. However, the systems described in the Boeing patent publication are often not able to protect surfaces from damage arising from surface impact with stones and other debris, such as that hazardous debris often encountered by race cars during a race. Further, the need for a clearcoat in order to obtain desired gloss on the outer surface undesirably increases weight of the assembly.

PCT Patent Publication No. WO2007/048141 (entrotech composites, llc; GLF Ref. No. entrotech 06-0002) describes how, when printed material is included on an exterior surface of a composite article, addition of a protective coating after application of the printed material on the surface is not required. Any printed material desired to be placed on an exterior surface of a composite article is pre-printed onto a protective sheet prior to its bonding to the underlying composite article. The protective sheet is then applied to the surface of an underlying composite article such that the printed material is outwardly visible. Protective sheets described therein have enhanced durability (e.g., abrasion resistance), impact resistance, and fracture toughness and are stated to be useful in a range of indoor and outdoor applications—for example, the transportation, architectural and sporting goods industries. However, as the protective sheets described therein are integrally bonded to the underlying surface, they are not easily removable from such surfaces or capable of being selectively applied to, for example, a race car's surface after manufacture and assembly of the car. Similar restrictions are associated with the graphic image fusion in-molded and extruded parts described in U.S. Pat. No. 7,166,249 (Abrams et al.).

U.S. Pat. No. 7,048,989 (3M Innovative Properties Co.) describes sheeting that may comprise a graphic. The graphic may be exposed on the viewing surface of the sheeting or disposed between a topcoat and the viewing surface of the sheeting. The topcoats are typically digitally printed by at least one method selected from laser printing, ink-jet printing, and thermal mass transfer printing. The topcoat is preferably reverse-imaged and then disposed such that the image is between the topcoat and a retroreflective core. It is stated that the retroreflective sheeting having the waterborne acrylic based topcoat may be used for a variety of uses such as traffic signs, license plates, pavement markings (e.g., raised pavement markings), personal safety, vehicle decoration and commercial graphics such as retroreflective advertising displays, bus wraps, etc.

U.S. Pat. No. 7,141,294 (3M Innovative Properties Co.) describes a decorative film using no appreciable amount, or no amount, of polyvinyl chloride. This decorative film comprises a substrate, an adhesive layer for sticking the decorative film to an adherend formed on one surface of the substrate, a printed layer provided with a printed decorative pattern or character information formed on the other surface of the substrate, and a top clear layer for protecting the printed layer. The substrate is formed from an ethylene-(meth)acrylic acid copolymer. The top clear layer used as an outer-most layer is preferably made of a material that is superior in weatherability and water resistance and has high transparency (e.g., colorless coating compositions such as fluororesins, thermosetting urethanes, and ultraviolet-curing compositions). The decorative film is described as having flexibility for adhering, ink adhesion, water resistance, and weatherability with good balance. It is also described as being suitable for various adherends, particularly for adhering to buildings or vehicles used outdoors, including curved surfaces such as the body of vehicles.

Despite the number of methods conventionally used for application and maintenance of graphics of the desired quality, improvements in that regard are desired. For example, it would be desirable to provide a film comprising protected graphics without requiring additional layers to protect the graphics or enhance gloss value of the underlying layers within the film. Particularly in the race car industry, such a film would facilitate obtainment of the ever-desired optimized aerodynamic performance.

BRIEF SUMMARY OF THE INVENTION

An improved protected graphics assembly according to the invention comprises the following sequential layers: optionally, at least one adhesive layer; at least one graphics layer; and at least one outwardly exposed polymer layer that is essentially free of low surface energy materials and has a gloss value of greater than 90 when tested according to ASTM D2457-03 at a 60-degree angle. In a further embodiment, the assembly consists essentially of an outwardly exposed polymer layer, a graphics layer underlying the polymer layer, and, optionally, one adhesive layer.

In an exemplary embodiment, the polymer layer is polyurethane-based. Further, in an exemplary embodiment, the adhesive layer comprises a pressure-sensitive adhesive. Still further, in an exemplary embodiment, the graphics layer comprises ink. The graphics layer can be continuous or discontinuous.

While thickness of the assembly can vary, in one embodiment the protected graphics assembly has a thickness of about 150 microns or less. In another embodiment, the protected graphics assembly has a thickness of about 100 microns or less. In yet another embodiment, the protected graphics assembly has a thickness of about 50 microns or less. In a further embodiment, the protected graphics assembly has a thickness of about 30 microns or less.

Within the assembly, the graphics layer has a thickness of about 5 microns to about 8 microns in one embodiment. With respect to the polymer layer, in one embodiment the polymer layer has a thickness of about 10 microns to about 50 microns. In another embodiment, the polymer layer has a thickness of about 25 microns or less.

In one embodiment, an article comprises at least one surface having on at least a portion thereof a protected graphics assembly of the invention. A variety of articles (e.g., motorized vehicles such as a race car) benefit from protected graphics assemblies of the invention. An exemplary race car comprises a protected graphics assembly on at least one portion of at least one surface thereof, wherein the protected graphics assembly comprises: optionally, at least one adhesive layer; at least one outwardly exposed polymer layer that is essentially free of low surface energy materials; and at least one graphics layer substantially protected from exterior exposure by the polymer layer. In an exemplary embodiment where performance is optimized, a portion of a protected graphics assembly applied to a front, exterior surface of a race car has a greater thickness than that applied elsewhere on the exterior surface of the race car.

Methods of the invention include a method of providing protected graphics on a surface. For example, such a method comprises: providing a protected graphics assembly of the invention and adhering the protected graphics assembly to at least a portion of a surface. In an exemplary embodiment, the surface comprises an exterior surface of a race car. According to one aspect of a method of the invention, a protected graphics assembly has a first thickness and is adhered to a front surface of the race car as a first protected graphics assembly. The method further comprises providing a second protected graphics assembly having a second thickness greater than the first thickness and adhering the second protected graphics assembly to at least a portion of the exterior surface of the race car other than the front surface.

BRIEF DESCRIPTION OF THE DRAWING

FIG. 1 illustrates a cross-sectional representation of one embodiment of a protected graphics assembly 100 of the invention, wherein a graphics layer 102 is interposed between an outwardly exposed polymer layer 104 and an adhesive layer 106. The overall thickness of the protected graphics assembly is illustrated therein by reference number 108.

DETAILED DESCRIPTION OF THE PREFERRED EMBODIMENTS OF THE INVENTION

Protected graphics of the invention are assemblies generally including a polymer layer and, optionally, an adhesive layer with a graphics layer disposed adjacent the polymer layer such that the graphics layer is outwardly visible, yet protected from mechanical and chemical exposure from the surrounding environment. In a preferred embodiment, the polymer layer, the graphics layer, and the optional adhesive layer are selected to be chemically compatible with each other in order to improve interlayer adhesion of the protected graphics assembly. For example, material properties contributing to high chemical affinity of the various layers with each other are identified and selected according to this embodiment of the invention. According to one aspect of this embodiment, the surface tension of each layer is within about 5 dynes per centimeter of the surface tension of adjacent layers therein. According to another aspect of this embodiment, the chemistries of adjacent layers within the protected graphics assembly are selected such that covalent bonds form between the layers. Each of the layers is described in further detail below.

Graphics Layer

While more than one graphics layer can be used to form graphical images in protected graphics assemblies of the invention, the following description is made with reference to one such layer for simplicity only. Recognize that, if multiple graphics layers are used, each graphics layer can be the same or different.

The graphics layer comprises any suitable material and provides desired aesthetics or required insignia. The graphics layer can be a continuous or discontinuous layer.

In an exemplary embodiment, the graphics layer comprises ink. Any suitable commercially available ink can be used. Non-limiting examples of suitable inks include pigmented acrylic ink (including pigmented fast-dry acrylic ink), pigmented urethane ink, epoxy ink, and a urethane enamel coating such as that sold by PRC Desoto International, Inc. of Glendale, Calif. under the trade designation, DESOTHANE HS. A number of suitable inks are commercially available from entrochem IIc (Columbus, Ohio) as identified by the following ink codes and associated ink colors: eca-301 (white), eca-305 (red), eca-306 (yellow), eca-307 (black), and eca-316 (blue).

If desired, an adhesion promoter may be included in the graphics layer. However, in preferred embodiments, the material comprising the graphics layer is selected to be chemically compatible with adjacent layers of the paint replacement film. Thus, an adhesion promoter is not generally required according to preferred embodiments of the invention.

The graphics layer generally comprises at least one material imparting desired color to the layer or portion thereof. Any suitable additives can optionally be used in the graphics layer. For example, stabilizers (e.g., antioxidants, heat stabilizers, and UV-stabilizers), crosslinkers (e.g., aluminum or melamine crosslinkers), corrosion inhibitors, plasticizers, photocrosslinkers, additional colorants, fillers, and other conventional additives as known to those of ordinary skill in the art can be incorporated into the graphics layer.

Preferably, the graphics layer is essentially free of low surface energy additives, where such components may promote interlayer delamination or otherwise detrimentally affect the adherence of the protected graphics to adjacent surfaces or layers.

The graphics layer comprises any suitable thickness. However, the graphics layer need only be thick enough to provide the desired quality of image. In an exemplary embodiment, the graphics layer has a maximum thickness of about 25 microns, preferably about 5 microns to about 8 microns.

Polymer Layer

While more than one polymer layer can be used in protected graphics of the invention or the polymer layer can comprise more than one distinct polymer, the following description is made with reference to one such layer and type of polymer within that layer for simplicity only. Recognize that, if multiple polymers or polymer layers are used, each polymer or polymer layer can be the same or different.

The polymer layer comprises any suitable material and provides protection for the underlying graphics layer. As an example, the polymer layer comprises a urethane film or an acrylic film in an exemplary embodiment.

Generally, the polymer layer is essentially free of vinyl, such as polyvinyl chloride (PVC), polyvinylidene fluoride (PVDF), or general polyvinyl fluoride (PVF) (e.g., that available from DuPont under the TEDLAR trade designation), as vinyl films typically are not adequately glossy. In certain applications, it is preferred that the polymer layer comprises a film having a gloss value of greater than 90 when tested according to ASTM D2457-03 at a 60-degree angle. As the polymer layer has such a significant gloss value according to these preferred embodiments, there is generally not a need for an additional topcoat (e.g., clearcoat) layer in assemblies according to the invention. Beneficially, this minimizes weight and dimensions of the assembly.

Further, generally the polymer layer is essentially free of low surface energy materials (e.g., silicones and fluoropolymers), which tend to promote interlayer delamination. Preferably, the polymer layer is polyurethane-based. The polymer layer is preferably polyurethane-based in that it comprises any suitable polyurethane material.

For simplicity, the term "polyurethane" is sometimes used herein to reference polymers containing urethane (also known as carbamate) linkages, urea linkages, or combinations thereof (i.e., in the case of poly(urethane-urea)s). Thus, polyurethanes of the invention contain at least urethane linkages and, optionally, urea linkages. Many commercially available types of polyurethane are available and suitable for use as polyurethane-based polymer layers according to the invention. For example, polyurethanes are available from Thermedics (Noveon, Inc.) of Wilmington, Mass., under the TECOFLEX trade designation (e.g., CLA-93AV) and from Bayer MaterialScience LLC of Pittsburgh, Pa., under the TEXIN trade designation (e.g., an aliphatic, ester-based polyurethane available under the trade designation, TEXIN DP7-3008).

Any suitable additives can optionally be included in the polymer layer. For example, stabilizers (e.g., antioxidants, heat stabilizers, and UV-stabilizers), crosslinkers (e.g., aluminum or melamine crosslinkers), binders, corrosion inhibitors, plasticizers, photocrosslinkers, colorants, fillers, and other conventional additives as known to those of ordinary skill in the art can be incorporated into the polymer layer. Nevertheless, in order to facilitate viewing of the underlying graphics layer, the polymer layer is generally clear. Thus, additives are selected accordingly.

Preferably, the polymer layer is essentially free of components that may tend to migrate to the outer surface of the protected graphics assembly or to an interface therein, where such components may promote interlayer delamination or otherwise detrimentally affect the adherence of the protected graphics assembly to adjacent surfaces or layers. The polymer layer is also preferably resistant to chemicals to which it may be exposed during use. For example, it is preferred that the polymer layer is resistant to degradation by water and hydraulic fluids. It is also preferred that the polymer layer is thermally resistant to temperatures to which it may be exposed during use.

The polymer layer comprises any suitable thickness. In one embodiment, the polymer layer has a thickness of about 10 microns to about 50 microns. In an exemplary embodiment, the polymer layer is about 25 microns thick or less. It has been found that use of a relatively thin polymer layer contributes to superior flexibility of the protected graphics assembly when applying the same to a surface. Such flexibility allows protected graphics assemblies of the invention to be effectively used in covering articles (e.g., aircraft) having curved or other non-planar surfaces.

Optional Adhesive Layer

While more than one adhesive layer can be used in protected graphics assemblies of the invention, or the adhesive layer can comprise more than one distinct adhesive, the following description is made with reference to one such layer and type of adhesive within that layer for simplicity only. Recognize that, if multiple adhesives or adhesive layers are used, each adhesive or adhesive layer can be the same or different.

The adhesive layer comprises any suitable material. According to one embodiment, the adhesive layer generally comprises a base polymer with one or more additives. While any suitable chemistry can be used for the base polymer in the adhesive layer, (meth)acrylate—acrylate and methacrylate—chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polybutadiene and copolymers thereof, polyisoprene or copolymers thereof, and silicones (e.g., polydimethylsiloxane and polymethylphenylsiloxane). In a preferred embodiment, the adhesive layer comprises a pressure-sensitive adhesive (PSA).

Any suitable additives can optionally be used in conjunction with the base polymer in the adhesive layer. For example, stabilizers (e.g., antioxidants, heat stabilizers, and UV-stabilizers), crosslinkers (e.g., aluminum or melamine crosslinkers), corrosion inhibitors, tackifiers, plasticizers, photocrosslinkers, colorants, fillers, and other conventional adhesive additives as known to those of ordinary skill in the art can be incorporated into the adhesive layer.

Preferably, the adhesive layer is essentially free of components that may tend to migrate to the outer surface of the protected graphics assembly or to an interface therein, where such components may promote interlayer delamination or otherwise detrimentally affect the adherence of the protected graphics assembly to adjacent surfaces or layers. The adhesive layer is also preferably resistant to chemicals to which it may be exposed during use. For example, it is preferred that the adhesive layer is resistant to degradation by water and hydraulic fluids.

The adhesive layer comprises any suitable thickness. In one embodiment, the adhesive layer has a thickness of about 5 microns to about 150 microns. In a further embodiment, the adhesive layer has a thickness of about 30 microns to about 100 microns. In an exemplary embodiment, the adhesive layer is about 25 microns thick or less. However, the thickness of the adhesive layer can vary substantially without departing from the spirit and scope of the invention.

Applications

Protected graphics assemblies of the invention are prepared according to any suitable method and according to principles known to those skilled in the art. In an exemplary embodiment, the graphics layer is reverse-printed on the polymer film, followed by adherence of the optional adhesive layer to the graphics layer. Any method of printing can be used in such a method. Conventional ink jet printing as known to those of ordinary skill in the art was found to be suitable for most applications.

Until the protected graphics assembly is adhered to a surface, it can be stored with an optional release liner adjacent the optional adhesive layer and with an optional carrier on the opposite side thereof. The selection and use of such carriers and liners is within the knowledge of one of ordinary skill in the art.

When applied, protected graphics assemblies can cover substantially all of or select portions of exterior surfaces on a variety of articles, such as those used in the transportation, architectural and sporting goods industries. Protected graphics assemblies of the invention are capable of providing all desired performance and aesthetic properties in an assembly of relatively thin dimension. Assemblies that are relatively thin enhance, for example, flexibility of the protected graphics assembly and, thus, improve the ease of application and adherence to non-planar surfaces. In this regard, preferably protected graphics assemblies of the invention have a total thickness of less than about 150 microns, more preferably less than about 125 microns, even more preferably less than about 100 microns, still more preferably less than about 75 microns, and most preferably less than about 50 microns.

In an exemplary embodiment, a thicker protected graphics assembly is applied to select portions of such surfaces as compared to that applied to other portions of the same surface. For example, an assembly having a total thickness of about 150 microns can be applied to the front surface of a race car or other transportation vehicle, which generally encounters greater surface impact from stones and other debris, while an assembly having a total thickness of about 30 microns can be applied elsewhere on the exterior surface of such a vehicle. Application of protected graphics assemblies in this manner tends to lower the overall weight of the vehicle and conserve fuel consumption among other benefits. In addition, as the protected graphics assemblies of the invention are capable of providing desired performance properties (e.g., impact resistance and wind resistance at a lower weight) and aesthetics (e.g., sufficiently high gloss values) as compared to traditional graphics assemblies for such applications, their application to such vehicles is highly beneficial.

Protected graphics assemblies of the invention can be applied to a surface according to principles and methodologies understood by those of ordinary skill in the art. For example, the release liner, if present, is first removed. Then, the surface to which the protected graphics assembly is to be adhered is sprayed with a cleaning and/or anti-slip agent (e.g., a mixture of three parts water to one part isopropanol). The bottommost layer (e.g., optional adhesive layer, when present, or graphics layer) of the protected graphics assembly may also be sprayed with such an agent. Once the protected graphics assembly is positioned over the surface to which it is to be applied, the film may also be sprayed with such an agent. Thereafter, the protected graphics assembly is firmly adhered to the underlying surface using, for example, a squeegee. Excess cleaning and/or anti-slip agent is then removed from the surface and the film is allowed to set for a time sufficient to prevent inadvertent removal of the film upon removal of any carrier used in conjunction therewith. The carrier, if used, is then removed.

Protected graphics assemblies of the invention are capable of being effectively and durably adhered to the exterior surface of a variety of articles. Not only do such assemblies provide protection for underlying graphics, but they also provide such protection without detracting from the quality of the graphics. Due to the relatively thin dimensions of the protected graphics assembly (e.g., even as thin as about 30 microns or less in certain embodiments), application of the assembly to a surface does not significantly increase weight of the overall article to significantly compromise performance of the article. Further, replacement of paint, graphic decals, or other surface materials with protected graphics assemblies of the invention can result in significant weight savings. Weight savings of this type are particularly advantageous when applying such protected graphics assemblies to race cars, where ever-increasingly stringent weight restrictions are applied. For example, weight otherwise associated with coverings on a race car's exterior surface can be strategically positioned elsewhere on the vehicle—such as in areas designed to increase the downforce and, hence, performance of a race car.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

The invention claimed is:

1. A protected graphics assembly consisting of:
    optionally, at least one adhesive layer;
    at least one graphics layer comprising at least one graphical image and having a thickness of about 5 microns to about 8 microns; and
    at least one polymer layer, one of which is outwardly exposed when the protected graphics assembly is applied to a surface, that is essentially free of vinyl and having a gloss value of greater than 90 when tested according to ASTM D2457-03 at a 60-degree angle and comprising a urethane film,
    wherein the protected graphics assembly has a thickness of about 150 microns or less.

2. The protected graphics assembly of claim 1, wherein the graphics layer comprises ink.

3. The protected graphics assembly of claim 1, wherein the graphics layer is discontinuous.

4. The protected graphics assembly of claim 1, wherein the protected graphics assembly has a thickness of about 100 microns or less.

5. A protected graphics assembly consisting of:
    optionally, at least one adhesive layer;
    at least one graphics layer comprising at least one graphical image and having a maximum thickness of about 8 microns; and
    at least one polymer layer, one of which is outwardly exposed when the protected graphics assembly is applied to a surface, that is essentially free of vinyl and having a gloss value of greater than 90 when tested according to ASTM D2457-03 at a 60-degree angle and comprising a urethane film,
    wherein the protected graphics assembly has a thickness of about 150 microns or less, and
    wherein the polymer layer has a thickness of about 10 microns to about 50 microns.

6. The protected graphics assembly of claim 5, wherein the polymer layer has a thickness of about 25 microns or less.

7. An article comprising the surface having on at least a portion thereof the protected graphics assembly of claim 5.

8. The article of claim 7, wherein the article comprises a motorized vehicle.

9. The article of claim 7, wherein the article comprises a race car.

10. A protected graphics assembly consisting of:
    optionally, at least one adhesive layer;
    at least one graphics layer comprising at least one graphical image and having a maximum thickness of about 8 microns; and
    at least one polymer layer, one of which is outwardly exposed when the protected graphics assembly is applied to a surface, that is essentially free of vinyl and having a gloss value of greater than 90 when tested according to ASTM D2457-03 at a 60-degree angle and comprising a urethane film,
    wherein the protected graphics assembly has a thickness of about 150 microns or less, and
    wherein the surface tension of each layer is within about 5 dynes per centimeter of surface tension of adjacent layers therein.

11. A protected graphics assembly consisting of:
    optionally, at least one adhesive layer;
    at least one graphics layer comprising at least one graphical image and having a maximum thickness of about 8 microns; and
    at least one polymer layer, one of which is outwardly exposed when the protected graphics assembly is applied to a surface, that is essentially free of vinyl and having a gloss value of greater than 90 when tested according to ASTM D2457-03 at a 60-degree angle and comprising a urethane film,
    wherein the protected graphics assembly has a thickness of about 150 microns or less, and
    wherein chemistries of adjacent layers within the protected graphics assembly are selected such that covalent bonds form between the layers.

12. A protected graphics assembly consisting of sequential layers as follows:
    at least one adhesive layer;
    at least one graphics layer comprising at least one graphical image and having a maximum thickness of about 8 microns; and
    at least one polymer layer, one of which is outwardly exposed when the protected graphics assembly is applied to a surface, that is essentially free of vinyl and having a gloss value of greater than 90 when tested according to ASTM D2457-03 at a 60-degree angle and comprising a urethane film,
    wherein the protected graphics assembly has a thickness of about 150 microns or less.

13. A protected graphics assembly consisting of sequential layers as follows:
    at least one adhesive layer;

at least one graphics layer having a maximum thickness of about 8 microns; and at least one polymer layer, one of which is outwardly exposed when the protected graphics assembly is applied to a surface, that is essentially free of vinyl and having a gloss value of greater than 90 when tested according to ASTM D2457-03 at a 60-degree angle and comprising a polyurethane material, wherein the protected graphics assembly has a thickness of about 150 microns or less.

14. The protected graphics assembly of claim 13, wherein the at least one graphics layer is continuous throughout the protected graphics assembly.

15. The protected graphics assembly of claim 13, wherein the at least one graphics layer comprises at least one material imparting color to the at least one graphics layer.

16. The protected graphics assembly of claim 13, wherein the adhesive layer comprises a pressure-sensitive adhesive.

17. The protected graphics assembly of claim 13, wherein the graphics layer is essentially free of low surface energy additives.

18. The protected graphics assembly of claim 13, wherein the polymer layer is essentially free of silicones and fluoropolymers.

19. The protected graphics assembly of claim 13, wherein the assembly is removable from a surface without interlayer delamination after adherence thereto.

20. The protected graphics assembly of claim 13, wherein the protected graphics assembly has a thickness of about 125 microns or less.

21. The protected graphics assembly of claim 13, wherein the protected graphics assembly has a thickness of about 75 microns or less.

22. A motorized vehicle comprising at least one surface having on at least a portion thereof the protected graphics assembly of claim 13, wherein a portion of the protected graphics assembly applied to a front, exterior surface of the motor vehicle has a greater thickness than that applied elsewhere on the exterior surface.

23. The motorized vehicle of claim 22, wherein the protected graphics assembly consists essentially of the outwardly exposed polymer layer, the graphics layer underlying the polymer layer, and the at least one adhesive layer.

24. A method of providing protected graphics on a surface, the method comprising:

providing the protected graphics assembly of claim 13; and adhering the protected graphics assembly to at least a portion of the surface.

25. The method of claim 24, wherein the surface comprises an exterior surface of a race car.

26. The method of claim 25, wherein the protected graphics assembly has a first thickness and is adhered to a front surface of the race car as a first protected graphics assembly and further comprising:

providing a second protected graphics assembly having a second thickness greater than the first thickness; and adhering the second protected graphics assembly to at least a portion of the exterior surface of the race car other than the front surface.

27. The method of claim 24, wherein the at least one graphics layer is reverse-printed on the at least one outwardly exposed polymer layer.

* * * * *